United States Patent
Tappermann et al.

(10) Patent No.: US 8,724,703 B2
(45) Date of Patent: May 13, 2014

(54) METHOD FOR MOTION ESTIMATION

(75) Inventors: Joerg Tappermann, Stuttgart (DE); Yalcin Incesu, Heidelberg (DE)

(73) Assignee: Sony Deutschland GmbH, Berlin (DE)

( * ) Notice: Subject to any disclaimer, the term of this patent is extended or adjusted under 35 U.S.C. 154(b) by 930 days.

(21) Appl. No.: 12/294,785

(22) PCT Filed: Mar. 28, 2007

(86) PCT No.: PCT/EP2007/002767
§ 371 (c)(1),
(2), (4) Date: Oct. 31, 2008

(87) PCT Pub. No.: WO2007/110238
PCT Pub. Date: Oct. 4, 2007

(65) Prior Publication Data
US 2010/0165210 A1    Jul. 1, 2010

(30) Foreign Application Priority Data

Mar. 29, 2006 (EP) .................... 06006610

(51) Int. Cl.
| | |
|---|---|
| H04N 7/12 | (2006.01) |
| G06K 9/00 | (2006.01) |
| G06K 9/36 | (2006.01) |
| H03M 7/40 | (2006.01) |
| H04N 7/18 | (2006.01) |
| H04N 7/26 | (2006.01) |
| H04N 5/14 | (2006.01) |
| H04N 11/02 | (2006.01) |

(52) U.S. Cl.
USPC ........ 375/240.16; 382/107; 382/236; 341/67; 347/416.1

(58) Field of Classification Search
USPC ................. 375/240.16; 382/107, 236; 341/67
See application file for complete search history.

(56) References Cited

U.S. PATENT DOCUMENTS 5,212,548 A * 5/1993 de Haan et al. ............ 348/416.1
6,240,211 B1 * 5/2001 Mancuso et al. ............... 382/236

(Continued)

FOREIGN PATENT DOCUMENTS

DE     103 27 577     1/2005
EP     1370086 A1 * 12/2003

(Continued)

OTHER PUBLICATIONS de Haan, G. ; Biezen, P.W.A.C. ; Huijgen, H. ; Ojo, O.A.; True-motion estimation with 3-D recursive search block matching; Circuits and Systems for Video Technology, IEEE Transactions on vol. 3 , Issue: 5; Digital Object Identifier: 10.1109/76.246088; Publication Year: Oct. 1993; pp. 368-379 and 388.*

(Continued)

Primary Examiner — Nirav B Patel
Assistant Examiner — Courtney Fields
(74) Attorney, Agent, or Firm — Oblon, Spivak, McClelland, Maier & Neustadt, L.L.P.

(57) ABSTRACT

A method for motion estimation with respect to a sequence of images. Respective updates are generated based on predictor vectors. The updates are distributed over a plurality of tables, which are organized in a plurality of table sets. Only a single table of updates, of a respective selected table set, is applied to a given predictor vector to generate a limited set of candidate vectors only. For a subsequent predictor vector, a further single table of the plurality of tables out of the plurality of table sets is applied.

16 Claims, 4 Drawing Sheets

(56) References Cited

U.S. PATENT DOCUMENTS

| | | | |
|---|---|---|---|
| 6,363,117 B1 | 3/2002 | Kok | |
| 6,385,245 B1 | 5/2002 | De Haan et al. | |
| 6,483,928 B1 * | 11/2002 | Bagni et al. | 382/107 |
| 6,879,268 B2 * | 4/2005 | Karczewicz | 341/67 |
| 6,996,175 B1 * | 2/2006 | Olivieri | 375/240.16 |
| 7,042,945 B2 * | 5/2006 | Bellers | 375/240.16 |
| 2006/0098886 A1 | 5/2006 | De Haan | |
| 2007/0098279 A1 | 5/2007 | Hahn et al. | |

FOREIGN PATENT DOCUMENTS

| | | |
|---|---|---|
| WO | 00 34920 | 6/2000 |
| WO | 2004 064403 | 7/2004 |

OTHER PUBLICATIONS

Chinese Office Action issued Jun. 9, 2011, in Patent Application No. 200780011670.1 (English-language translation only).

Zhi Yang et al,"A Framework for Fine-Granular Computational-Complexity Scalable Motion Estimation", Circuits and Systems, IEEE, pp. 5473-5476, XP010816771, (2005).

Hann De G et al., "True-Motion Estimation with 3-D Recursive Search Block Matching", IEEE Transaction on Circuits and Systems for Video Technology, IEEE, vol. 3, No. 5, pp. 368-379, XP002280683, (1993).

Wittebrood R B et al.,"Second Generation Video Format Conversation Software for a Digital Signal Processor", IEEE Transactions on Consumer Electronics, vol. 46, No. 3, pp. 857-865, XP001142914, (2000).

Beric A et al., "A Technique for Reducing Complexity of Recursive Motion Estimation Algorithms", Signal Processing Systems, IEEE, pp. 195-200, XP010661014, (2003).

Braspenning R et al., "Efficient Motion Estimation with Content-Adaptive Resolution",International Symposium on Consumer Electronics, pp. E29-E34, XP002245757, (2002).

Virk K et al., "Low Complexity Recursive Search Based Motion Estimation Algorithm for Video Coding Applications", EUSIPCO, 13$^{th}$ European Signal Processing Conference, XP002411342, Retrieved from the Internet: URL:http://www.ee.bilkent.edu.tr/ {signal/defevent/papers/cr1099.pdf> p. 2 (2005).

Office Action issued Oct. 8, 2010, in China Patent Application No. 200780011670.1 (English-language Translation only).

Office Action mailed Mar. 12, 2012, in Chinese Patent Application No. 200780011670.1 (with English-language translation).

\* cited by examiner

METHOD FOR MOTION ESTIMATION

FIELD OF THE INVENTION

The present invention relates to a method for motion estimation and in particular to a method for motion estimation with respect to a sequence of images. More particular, the present invention relates to multi-table updates for spatial temporal predictors in a recursor for motion estimating process or recursor for motion estimator.

BACKGROUND OF THE INVENTION

In many processes for image processing or image pre-processing methods for motion estimation with respect to a sequence of images are applied. In these known methods based on predictor vectors so-called predictor vector updates are generated which are then applied to the predictor vector or predictor vector candidate in order to generate candidate vectors or candidate motion vectors. Such candidate vectors are then classified and a distinct candidate vector is chosen as a best one with respect to a certain criterion.

The crucial point is the conversions of such a process. Conversion performance, sub-pixel estimation, granularity, and the like can improved by increasing large numbers of updates which should be generated and applied to a given predictor vector. However, the computational burden increases with the number of updates which have to be applied to the predictor vector in order to create a larger number of candidates.

SUMMARY OF THE INVENTION

It is, therefore, an object underlying the present invention, to provide a method for motion estimation which has enhanced conversion properties and/or sub-pixel estimation granularity properties without significantly increasing the computational burden.

A method for motion estimation is presented herein. Preferred embodiments include an inventive method for motion estimation. A system, a computer program product, and a computer readable storage medium are also presented herein.

In its broadest sense of the present invention a method for motion estimation is provided in which updates to a predictor vector are distributed over a plurality of tables so that each table contains less than the entire number of generated updates for the predictor vector. Additionally, only the updates of a single table are applied to the predictor value in order to generate candidate vectors. Therefore, even, if the number of updates is enlarged the computational burden when generating the candidate vectors is not increased.

According to the present invention, in particular a method for motion estimation with respect to a sequence of images is provided.

According to the present invention a method for motion estimation with respect to a sequence of images is provided wherein based on predictor vectors respective updates are generated, wherein said updates are distributed over a plurality of tables and wherein only a single table of updates is applied to a given predictor vector in order to generate a limited set of candidate vectors only.

According to the present invention a method for motion estimation with respect to a sequence of images is provided which—additionally or alternatively—comprises (a) a step of providing digital image data representing a sequence of images, (b) a step of providing one or a plurality of predictor vectors, (c) a step of generating updates for predictor vectors, (d) a step of generating for updates a candidate vector, thereby providing a plurality of candidate vectors by applying said selected updates to a given predictor vector, (e) selecting from said plurality of candidate vectors a distinct candidate vector which fulfils a given matching criterion as a motion vector candidate, (f) wherein the steps (c), (d) and (e) are performed recursively until a given termination criterion is fulfilled, (g) wherein, as a result of each recursion, said predictor vectors or a subset thereof are updated by providing respective updates, (h) wherein said updates are distributedly organized and stored within a plurality of update tables, (i) wherein as a consequence each update table contains less than a complete number of updates, and (j) wherein in said step (d) of generating said candidate vectors only the updates of a single update table are applied to a given predictor vector.

It is therefore one idea of the present invention to apply only a limited number of updates to the respective predictor vector by choosing a distinct update table out of the plurality of update tables.

BRIEF DESCRIPTION OF THE DRAWINGS

The invention will now be explained based on preferred embodiments thereof and by taking reference to the accompanying and schematical figures.

DETAILED DESCRIPTION OF THE INVENTION

Figure 1:
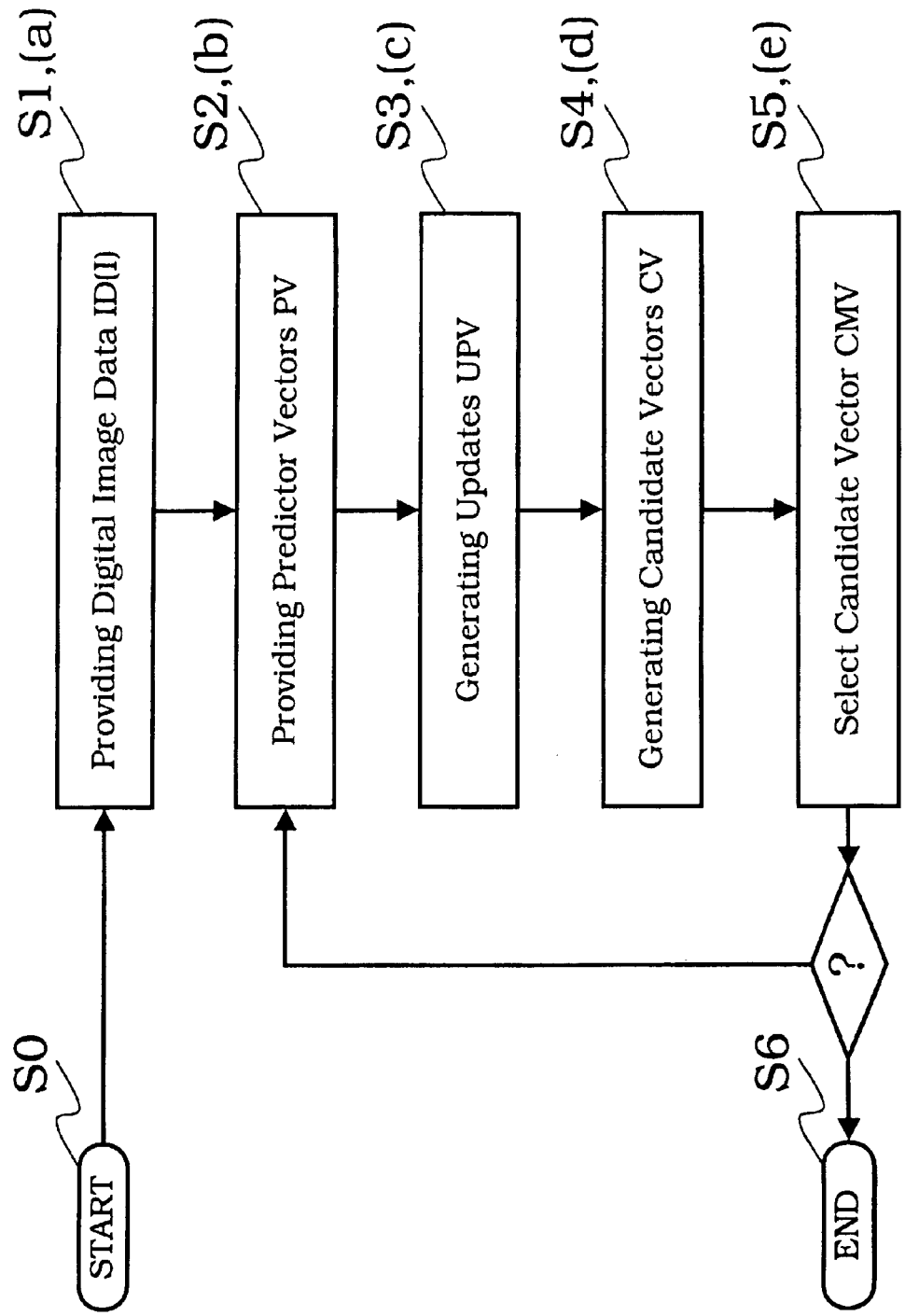
FIG. 1 is a schematical block diagram which elucidates some basic aspects of a preferred embodiment of the inventive method for motion estimation.

In the following functional and structural similar or equivalent elements and structures will be denoted with the same reference symbols. Not in each case of their occurrence a detailed description will be repeated.

According to the present invention a method for motion estimation with respect to a sequence of images is provided wherein based on predictor vectors PV respective updates UPV are generated, wherein said updates UPV are distributed over a plurality of tables t1, . . . , tN, and wherein only a single table t1, . . . , tN of updates UPV is applied to a given predictor vector PV in order to generate a limited set of candidate vectors CV only.

As can also be obtained from the figures, additional or alternatively according to the present invention a method for motion estimation with respect to a sequence of images is provided which comprises (a) a step of providing digital image data ID representing a sequence of images I, (b) a step of providing one or a plurality of predictor vectors PV, (c) a step of generating updates UPV for predictor vectors PV, (d) a step of generating for updates UPV a candidate vector CV, thereby providing a plurality of candidate vectors CV by applying said selected updates UPV to a given predictor vector PV, (e) selecting from said plurality of candidate vectors CV a distinct candidate vector CV which fulfils a given matching criterion as a motion vector candidate MVC, (f) wherein the steps (c), (d) and (e) are performed recursively until a given termination criterion is fulfilled, (g) wherein, as a result of each recursion, said predictor vectors PV or a subset thereof are updated by providing respective updates UPV, (h) wherein said updates UPV are distributedly organized and stored within a plurality of update tables t1, ..., tN, (i) wherein as a consequence each update table t1, ..., tN contains less than a complete number of updates UPV, and (j) wherein in said step (d) of generating said candidate vectors CV only the updates UPV of a single update table (t) are applied to a given predictor vector PV.

According to a preferred embodiment said plurality of update tables t1, ..., tN can be organized in a plurality of table sets s1, ..., sm.

In particular the number m of table sets s1, ..., sm can be less than the number N of tables t1, ..., tN.

Each table set s1, ..., sm may contain an equal number or almost equal number of update tables t1, ..., tN.

Said updates UPV may be equally or almost equally distributed over the entirety of update tables t1, ..., tN.

Each update UPV) may contain or represent an X component update value and an Y component update value.

Said update tables t1, ..., tN and said table set s1, ..., sm may be stored in a memory M.

Said memory M may be dynamically configurable and/or dynamically configured during run-time.

Said update tables t1, ..., tN may be dynamically reconfigured with respect to their content. Thereby, given image sequence properties may be fulfilled.

Said image sequence properties may be one or a plurality of small motion, strong motion and rotation.

Said step (b) of providing one or a plurality of predictor vectors PV may be included in said process (f) of recursion.

For each predictor vector PV about 50 updates UPV may be generated, which may be in particular distributed over about 5 update tables t1, ..., t5.

Possible positive, negative, short, long, integer and/or fractional update values are homogenously distributed over the update tables t1, ..., tN in order to reduce a spatial correlation.

Estimation may be started for a new vector row with a table index which is different from a table index of the previously estimated vector row.

Estimation of a new vector field may be started with a table index which is different from a table index of a previously estimated vector field.

Selection of an update t1, ..., tN and/or of a table set s1, ..., sm may be performed by using a motion model classifier MMC.

According to another aspect of the present invention a System for motion estimation is provided, which is adapted and which comprises means in order to perform the method for motion estimation according to the present invention and the steps thereof.

According to further aspect of the present invention a computer program product is provided, comprising computer program means which is adapted in order to perform a method for motion estimation according to the present invention and the steps thereof when it is executed on a computer or a digital signal processing means.

Additionally, a computer readable storage medium is provided, comprising a computer program product according to the present invention.

These and further aspects of the present invention will be further discussed in the following:

The invention inter alia also relates to multi-table updates for spatio-temporal predictors in a recursive motion estimator.

Spatio-temporal recursive motion estimation algorithms typically use predictor vector updates in order to generate candidate vectors. From these candidates a vector will be chosen as the best suitable one. In order to improve the convergence performance and the sub-pixel estimation granularity, a large number of updates should be applied to a predictor vector. This will increase the number of candidate evaluations to an amount which is not advantageous. The idea of this invention is to distribute this large number of updates over a set of update tables and to apply only the updates of a single table to a respective predictor vector in order to generate a set of candidate vectors. This allows using a large number of different updates—long/short values for fast convergence and integer/sub-integer values for sub-pixel candidates—while still having a small number of candidates to be evaluated per estimated vector. Each table contains a limited number of updates that consist of X- and Y-component update values which are used to generate a candidate vector from a given predictor vector. The tables are stored in memory to be configurable during run-time in order to allow a dynamic reconfiguration of the tables' content to match certain image sequence properties, such as small motion, strong motion, rotation and so forth.

It is true for all recursive algorithms, and also for the recursive motion estimation algorithm, that convergence speed is an issue. The recursive approach in motion estimation utilizes the assumption, that vectors in close proximity are similar. This allows for a reduced number of candidate vectors to be evaluated in order to find a best matching vector. This is especially true in comparison to full-search algorithms, which evaluate a vast number of candidates. The recursive component is that the current candidates are based on previous best matching vectors, the so called predictors. By applying a set of update vectors to such a predictor, the candidates are created.

The prior art methods show poor estimation performance when the resulting vector must converge from e.g. background speed to the speed of a moving object. In this case, the difference between a spatial predictor and the vector to be estimated is too large in order for a candidate vector to closely match the ideal vector. This leads to errors in the vector field in the proximity of object boundaries. Due to the limited number of update values, the ideal vector is not part of the evaluated candidate set. A typical example of large differences is where the object speed and the background speed are non-zero and furthermore both move in opposite directions.

An update consists of an X- and Y-component. For example, 10 updates with component values in the range of ±4 were used in a prior art method. That is, the resulting vectors can change only be 4 units at a time. Now, if the difference between fore- and background speed is e.g. 13, in the optimal case it takes 3 estimation steps for the resulting vectors to converge to the new speed. But worst case, with poor updates, the estimation process might not converge to the new speed at all. This slow convergence results in a poor vector field quality which in turn leads to interpolation artifacts in the image interpolation application.

Furthermore, in order to perform a sub-pixel accurate motion estimation process, sub-pixel candidates are generated using sub-pixel update values. This even increases the number of candidates to be evaluated per estimated vector.

To overcome these problems, as an intermediate development step the number of update values per predictor and their update value range was increased. The value range was increased to e.g. ±16 and the number of updates was increased to e.g. 50. This larger number of candidates improved the convergence quality dramatically. But in the target implementation under investigation this large set of candidates caused a big problem for a real-time performance. So the idea of distributing the large number of candidates to multiple update tables reduced the number of candidates per predictor while maintaining the estimation quality and changing the implementation structure as little as possible.

It has to be noted, that the numbers given in this description are specific example values of a general concept idea. From above description we assume the preferable number of candidates per predictor to be 50. But at the time of the invention this number was not possible to be implemented, neither in HW due to logic size and real-time performance nor in SW due to computational load reasons. So splitting these update values into e.g. 5 sets of 10 updates each and respectively applying only 10 updates per predictor made an implementation possible. Each table entry is an update value consisting of an X- and Y-component value.

By applying a new set of updates to each new predictor, within 5 consecutive predictors all possible update values are applied and thus all 50 desired candidate vectors are evaluated. This is small enough to apply all update values to predictors in the close spatial proximity. One preferable implementation to even improve this approach is that all possible update values, positive and negative, short and long as well as integer and fractional values are to be distributed homogenously over all 5 tables. This minimizes the correlation of the estimation result to the respective spatial position. But of course, different table configurations are also possible.

It is important to de-correlate the individual update table content from the spatial location of the respective estimated vector. A preferred method is to start the estimation of a new vector row with a table index which is different from the table index of the previous row. Also, estimating a new vector field should be started with a table index which is different from the one for previous field.

FIG. 1 is a schematical block diagram for elucidating a preferred embodiment of the inventive method for motion estimation of the sequence of images.

After an initializing step S0 a first step S1 of (a) providing digital image data ID is performed. Said digital image data (ID) represents a sequence of images I, for instance a video sequence or the like.

In a following step S2 one or a plurality of predictor vectors PV are provided (b).

Based on said predictor vectors PV in a following step S3 updates UPV or update values for said predictor vectors PV are generated (c).

In a next step S4 updates UPV are used in order to generate candidate vectors CV for each selected update value UPV. Thereby, a plurality of candidate vectors CV is provided (d). This is done by applying the selected updates or update values UPV to a given predictor vector PV.

From the generated plurality of candidate vectors CV a distinct candidate is selected (e) in a following step S5. The selected candidate has to fulfil a given matching criterion. The selected candidate vector CV is also called a motion vector candidate MVC.

Steps S2 to S5 are recursively performed until a certain termination criterion is fulfilled.

The method shown in FIG. 1 is terminated with a finalizing step S6.

Figure 2:
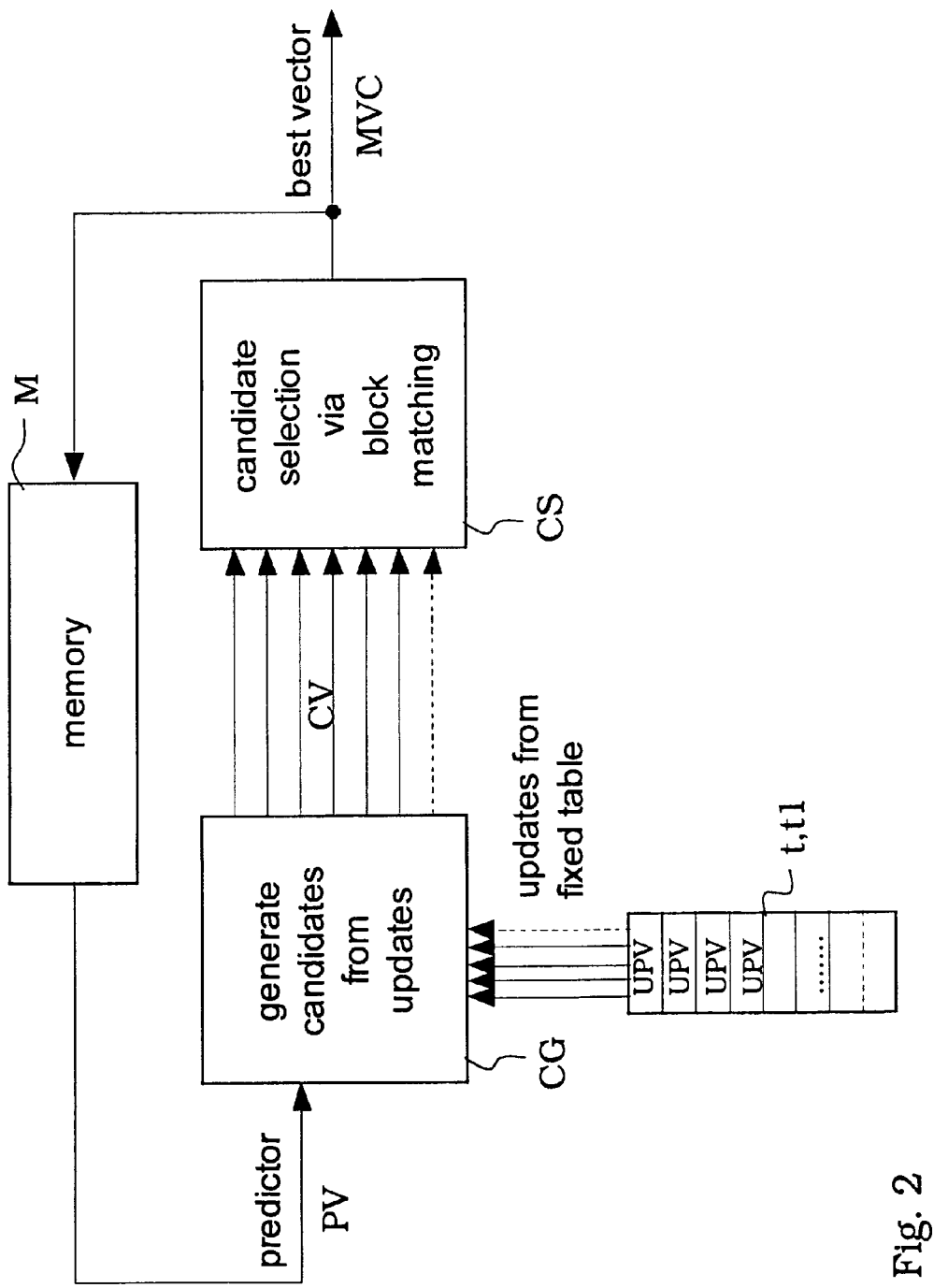
FIG. 2 is a schematical block diagram which elucidates further aspects of the inventive method for motion estimation.

The block diagram in FIG. 2 shows the basic concept of the estimation process estimation which starts with the generation of candidates using a predictor PV and respective updates UPV. From these candidates CV the best one will be chosen, according to a selection criterion, typically a block match error value. The best vector CMV will be stored in memory M from which the next predictor PV will then be read. This loop represents the state-of-the-art in motion estimation.

Figure 3:
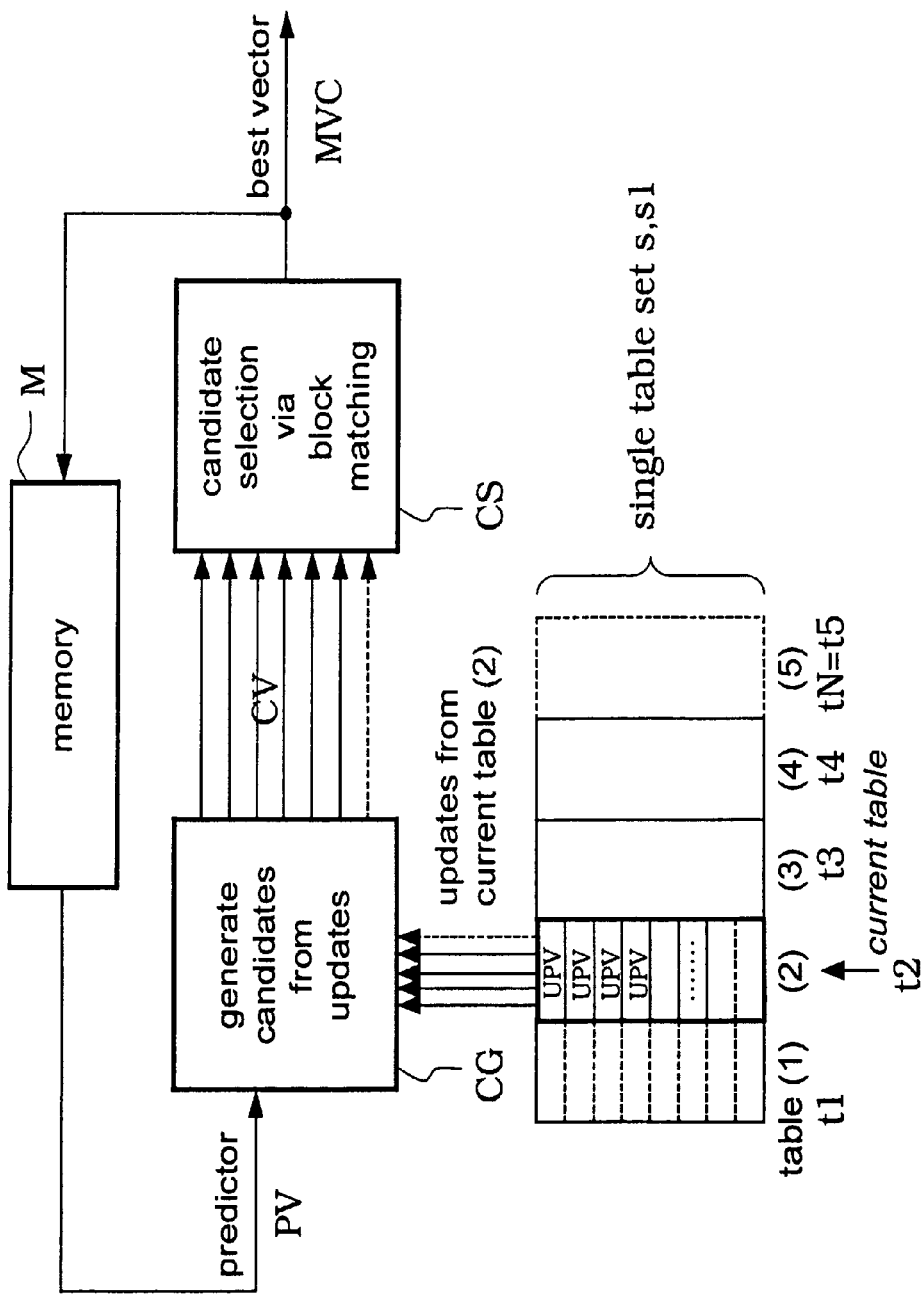
FIG. 3 is a schematical block diagram which elucidates a preferred embodiment of the inventive method for motion estimation, wherein a single set of update tables in involved.

FIG. 3 shows a first preferred embodiment of the update table idea. The updates UPV for a predictor PV are stored in a multi-table array, a so called table set s or s1. For a first predictor PV, the update values UPV from table t2 with e.g. index (2) are used. For the next predictor PV, the updates UPV are read from table t3 with index (3). For each new predictor PV the updates UPV are read from a table tj with a different table index j. The current table index pointer rotates through all available tables t1, . . . , tN and then starts again with table t1.

Figure 4:
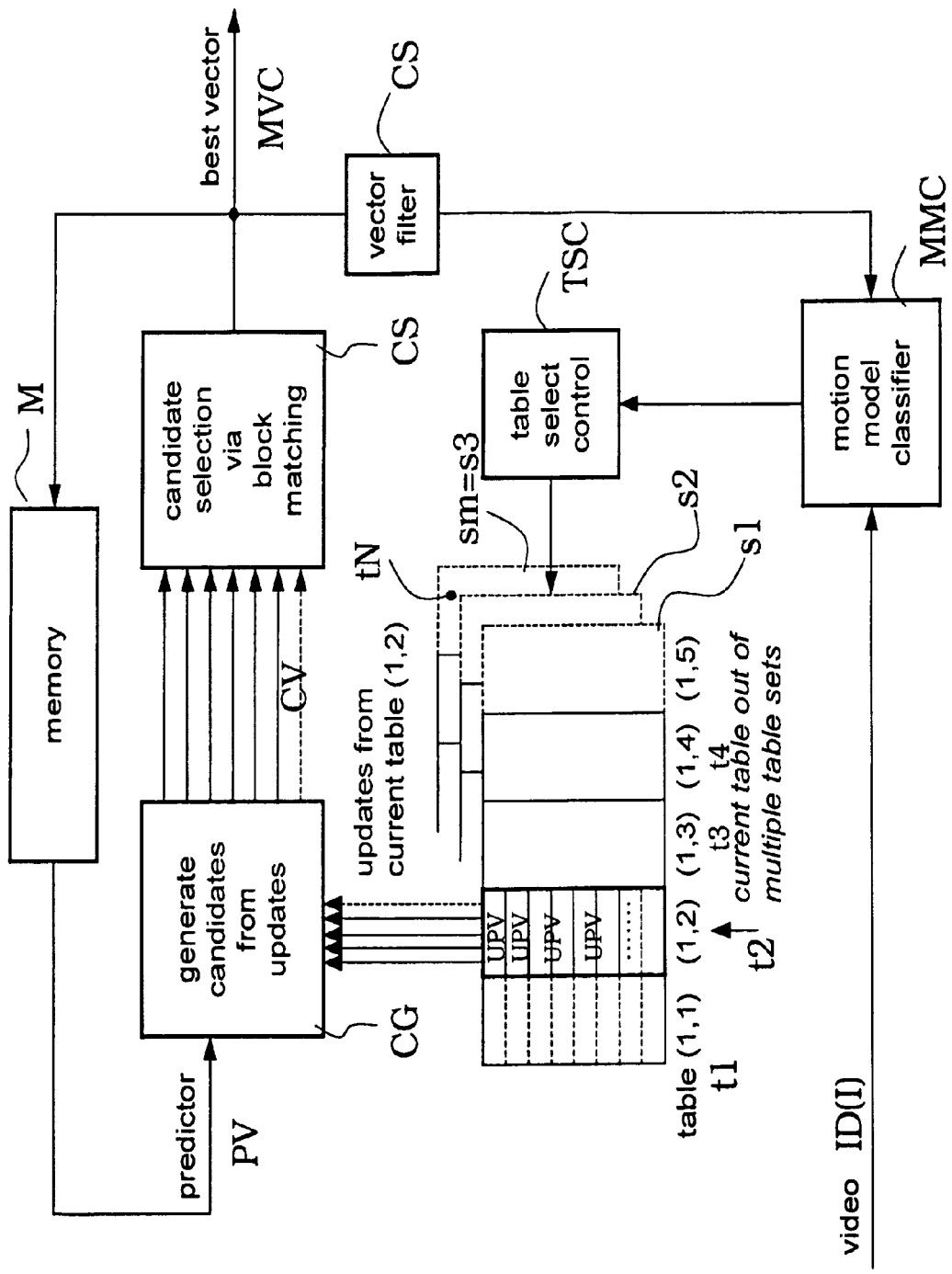
FIG. 4 is a schematical block diagram which elucidates a preferred embodiment of the inventive method for motion estimation, wherein a plurality of sets of update tables in involved.

In FIG. 4 an advanced concept is shown representing another embodiment. Here, several table sets s1, . . . , sm are provided. A table selection control module TSC selects the respective table set sk to be used. Switching between several table sets sk is done with respect to a motion model classifier MMC. This classifier MMC uses the estimated vectors CMV, which are filtered prior using a vector filter VF, and the video images in order to determine a respective motion model. By utilizing the motion model and with respect to the current spatial location of the vector to be estimated, an optimized table set will be used for the predictor updates UPV.

REFERENCE SYMBOLS

CG candidate generation
CS candidate selection
CV candidate vector
I image
ID digital image data
M memory
MMC Motion model classifier
MVC motion vector candidate
PV predictor vector
sj table set, set of update tables; j=1, . . . , m
tk update table, table; k=1, . . . , N
TSC Table selection control (module)
VF Vector filter

The invention claimed is:

1. A method for motion estimation, with respect to a sequence of images, executed on a computer or a digital signal processor, the method comprising:
generating respective updates based on predictor vectors;
distributing the updates over a plurality of tables organized in a plurality of table sets, each of the table sets containing a plurality of tables, and each of the tables including a plurality of updates;
selecting a respective table set from the table sets by using a motion model classifier;
applying only a single table of updates of a respective selected table set to a given predictor vector to generate a limited set of candidate vectors only; and
applying, for a subsequent predictor vector, the updates of a further single table of the tables of a selected table set, wherein
the tables and the table sets are stored in a memory that is dynamically configurable and/or dynamically configured during a run-time.

2. A method according to claim 1, comprising:
(a) providing digital image data representing a sequence of images;
(b) providing one or a plurality of predictor vectors;
(c) generating updates for the predictor vectors;
(d) generating for the updates a candidate vector, thereby providing a plurality of candidate vectors by applying selected updates to a given predictor vector;

(e) selecting from the plurality of candidate vectors a distinct candidate vector that fulfills a given matching criterion as a motion vector candidate;
(f) wherein the generating (c), generating (d), and generating (e) are performed recursively until a given termination criterion is fulfilled;
(g) wherein, as a result of each recursion, the predictor vectors or a subset thereof are updated by providing respective updates;
(h) wherein the updates are distributedly organized and stored within a plurality of update tables which are organized in a plurality of table sets;
(i) wherein as a consequence each update table contains less than a complete number of updates; and
(j) wherein in the generating (d) generating the candidate vectors, a respective table set out of the plurality of table sets is selected by using a motion model classifier and only the updates of a single update table of the respective selected table set are applied to a given predictor vector, and for a subsequent predictor vector, a further single table of the plurality of tables out of the plurality of table sets is applied.

3. A method for motion estimation, with respect to a sequence of images, executed on a computer or a digital signal processor, the method comprising:
(a) providing digital image data representing a sequence of images;
(b) providing one or a plurality of predictor vectors;
(c) generating updates for the predictor vectors;
(d) generating for the updates a candidate vector, thereby providing a plurality of candidate vectors by applying selected updates to a given predictor vector;
(e) selecting from the plurality of candidate vectors a distinct candidate vector that fulfills a given matching criterion as a motion vector candidate;
(f) wherein the generating (c), generating (d), and generating (e) are performed recursively until a given termination criterion is fulfilled;
(g) wherein, as a result of each recursion, the predictor vectors or a subset thereof are updated by providing respective updates;
(h) wherein the updates are distributedly organized and stored within a plurality of update tables which are organized in a plurality of table sets, each of the tables sets containing a plurality of update tables, and each of the update tables including a plurality of updates;
(i) wherein as a consequence each update table contains less than a complete number of updates; and
(j) wherein in the generating (d) generating said candidate vectors, a respective table set out of the plurality of table sets is selected by using a motion model classifier and only the updates of a single update table of the respective selected table set are applied to a given predictor vector, and for a subsequent predictor vector, the updates of a further single table of the tables of a selected table set are applied, wherein
the update tables and the table sets are stored in a memory that is dynamically configurable and/or dynamically configured during a run-time.

4. A method according to claim 3, wherein the number of table sets is less than the number of update tables.

5. A method according to claim 4, wherein each table set contains an equal number or almost equal number of update tables.

6. A method according to claim 3, wherein the updates are equally or almost equally distributed over the entirety of update tables.

7. A method according to claim 3, wherein each update contains or represents an X component update value and an Y component update value.

8. A method according to claim 3,
wherein the update tables are dynamically reconfigured with respect to their content; and
wherein thereby given image sequence properties are fulfilled.

9. A method according to claim 8, wherein the image sequence properties are one or a plurality of small motion, strong motion, and rotation.

10. A method according to claim 3, wherein the (b) providing one or a plurality of predictor vectors is included in the process (f) of recursion.

11. A method according to claim 3, wherein for each predictor vector about 50 updates are generated, which are distributed over about 5 update tables.

12. A method according to claim 3, wherein possible positive, negative, short, long, integer, and/or fractional update values are homogenously distributed over the update tables to reduce a spatial correlation.

13. A method according to claim 3, wherein estimation is started for a new vector row with a table index that is different from a table index of the previously estimated vector row.

14. A method according to claim 3, wherein estimation of a new vector field is started with a table index that is different from a table index of a previously estimated vector field.

15. A system for motion estimation, comprising:
a computer or digital signal processor configured to execute the method for motion estimation according to claim 1.

16. A non-transitory computer readable storage medium, comprising:
executable instructions, which when executed by a computer or a digital signal processor, cause the computer or the digital signal processor to perform the method for motion estimation according to claim 1.

* * * * *